(12) United States Patent
Schuler et al.

(10) Patent No.: US 11,418,654 B1
(45) Date of Patent: Aug. 16, 2022

(54) METHOD AND APPARATUS FOR HANDLING CALLBACK OF A PUBLIC-SAFETY OFFICER

(71) Applicant: MOTOROLA SOLUTIONS, INC., Chicago, IL (US)

(72) Inventors: Francesca Schuler, Palatine, IL (US); Nadeem Z Kureishy, Huntley, IL (US); Vidya Sagar Pitta Eswara Chandra, Arlington Heights, IL (US); Brian J Frommelt, Naperville, IL (US); Kylene Tanner, Bountiful, UT (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 17/305,836

(22) Filed: Jul. 15, 2021

(51) Int. Cl.
    *H04M 3/54* (2006.01)
    *H04M 3/51* (2006.01)

(52) U.S. Cl.
    CPC ........ *H04M 3/541* (2013.01); *H04M 3/5116* (2013.01)

(58) Field of Classification Search
    None
    See application file for complete search history.

(56) References Cited

U.S. PATENT DOCUMENTS

| | | | |
|---|---|---|---|
| 6,778,653 B1* | 8/2004 | Kallas | H04M 3/36 379/201.05 |
| 8,165,560 B2 | 4/2012 | Stenquist | |
| 8,666,031 B2 | 3/2014 | Rowe et al. | |
| 9,438,735 B2* | 9/2016 | Tietsch | H04L 41/5074 |
| 10,917,521 B1 | 2/2021 | Kostner et al. | |
| 2010/0158236 A1* | 6/2010 | Chang | H04M 3/5175 379/265.03 |
| 2014/0161249 A1* | 6/2014 | Tolksdorf | H04M 3/523 379/266.1 |

OTHER PUBLICATIONS 10-21 Police Phone—Callyo—https://web.archive.org/web/20201202070326/https://callyo.com/public-safety/10-21-police-phone Published on Dec. 2, 2020.
NENA i3 Standard for Next Generation 9-1-1—published Nov. 13, 2020.
Pappas, Scott J. et al.: "Method and Apparatus for Handling Citizen Callback of a Public-Safety Officer", U.S. Appl. No. 17/233,738, filed Apr. 19, 2021, all pages.
Pappas, Scott J. et al.: "Device, System and Method for Selecting a Public Safety Answering Point Server to Include on a Call", U.S. Appl. No. 17/316,427, filed May 10, 2021, all pages.

* cited by examiner

*Primary Examiner* — Hemant S Patel

(57) ABSTRACT

A method for routing civilian calls to an associated public-safety officer is provided herein. During operation, a call processor receives a civilian call having a target identifier number identifying a target of the call. An incident identifier is then received from the calling party. A current workflow point is determined for the identified incident, and the call is routed to an appropriate person based on the workflow point for the identified incident.

15 Claims, 3 Drawing Sheets ly available.
METHOD AND APPARATUS FOR HANDLING CALLBACK OF A PUBLIC-SAFETY OFFICER

BACKGROUND OF THE INVENTION

Best policing practices operate under the assumption that community safety must be a joint venture of police and citizens. This joint venture (sometimes referred to as community policing) establishes better public relations and throttles back public skepticism of police. With community policing, citizen engagement is fostered when public-safety officers are readily available.

Some communities give citizens the ability to "callback" officers to receive and provide updates regarding incidents. While these callbacks are encouraged to foster better communications, they can be disruptive to an officer's daily responsibilities when an officer receives a call that should have been routed to another officer. A solution is needed to allow citizen callbacks while avoiding officer disruptions.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
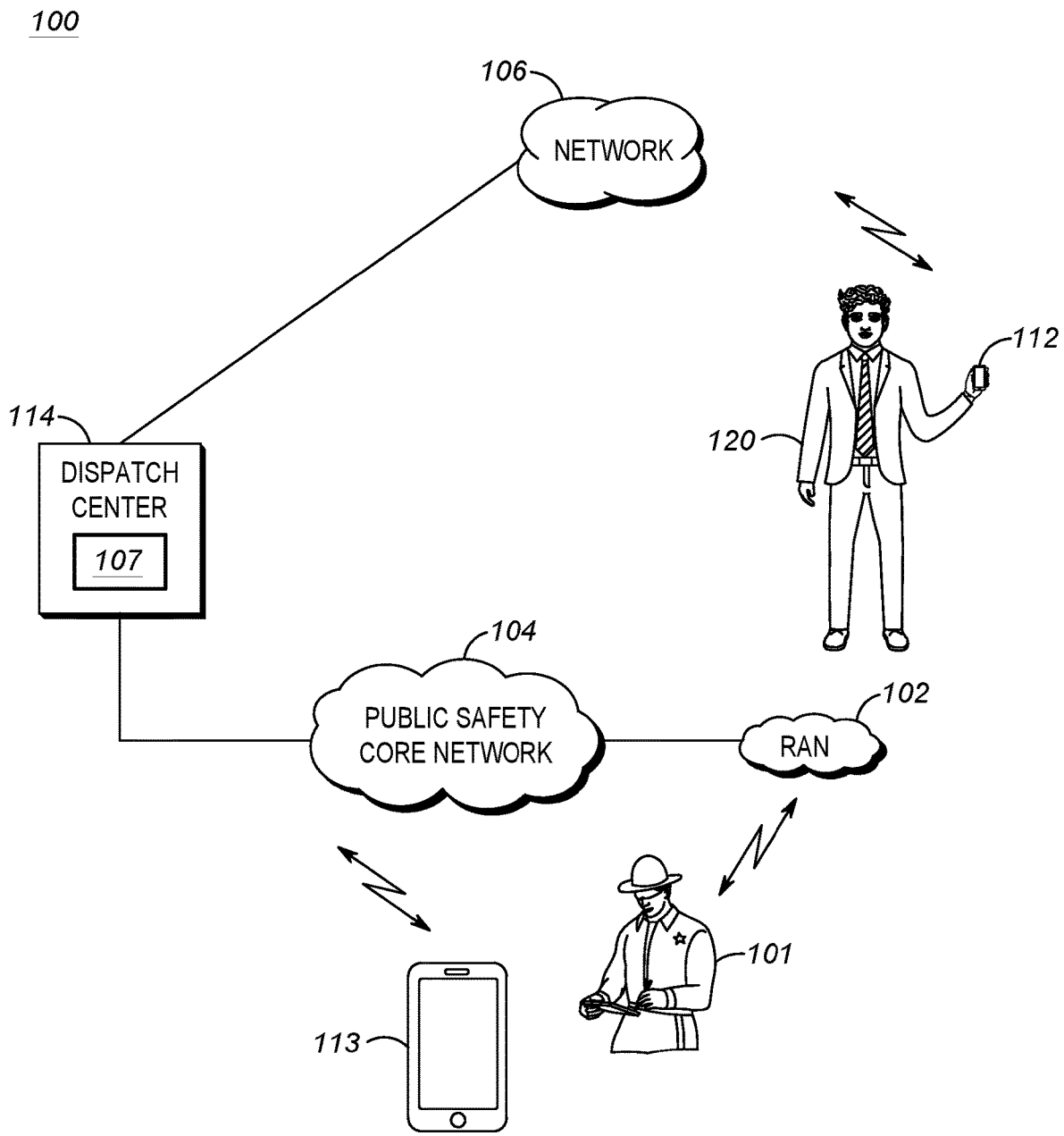
FIG. 1 illustrates an operating environment for the present invention.

Skilled artisans will appreciate that elements in the figures are illustrated for simplicity and clarity and have not necessarily been drawn to scale. For example, the dimensions or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions or steps may be described or depicted in a particular order of occurrence while those skilled in the art will understand that such specificity with respect to sequence is not actually required.

DETAILED DESCRIPTION

In order to address the above-mentioned need, a method for routing civilian calls to a public-safety officer is provided herein. During operation, a call is received from an individual, the call comprising a target phone number. The target phone number comprises a phone number that is assigned exclusively to a first officer's device during a first time period. Alternatively, the target phone number may be assigned exclusively to a second officer's device during a second time period. A case identifier is received from the individual, the case identifier identifying a particular public-safety incident. An officer to route the call to is determined based on the case identifier and the target phone number.

Expanding on the above, the step of determining an officer to route the call to comprises the steps of using the case identifier to determine a workflow point of the public-safety incident, and determining the officer to route the call to based on the case identifier, the target phone number, and the workflow point of the public-safety incident.

As an example of the above, consider a situation where a student's bicycle is stolen. Officer John works with the victim to file a police report and provides his phone number in case the victim has any future questions. Two days pass and the victim needs a copy of the police report for insurance purposes. The victim calls Officer John on the number provided to find out whether anyone has found the bike and to ask for the report. Since the incident has been closed by Officer John, and now being handled by, for example, a clerk in the records department, Officer John will not be interrupted, and instead, the call will be routed to the clerk in the records department.

Consider another example where a spousal abuse victim has called police on numerous occasions. Officer Jane typically handles her case and has developed a strong relationship with the victim. Officer Jane provides the victim with her callback number, a case number, and instructs her to call if she needs further advice. Checking the workflow on this matter reveals that the call is to be routed to Officer Jane regardless of the workflow status of case number applied.

In order to better explain operation of handling a citizen callback of an officer, the following definitions are provided:

Incident Record—A digital accounting of a past public-safety incident. The digital accounting includes information such as, but not limited to a type of incident, an incident identifier, identification of parties involved in the incident, identification of public-safety officers involved in the incident, a time and place of the incident, and a work flow point of the incident. The incident record may be generated automatically, or generated by a public-safety dispatch operator typing in information into an incident form to generate the incident record.

Work Flow Point of an Incident—A point within an orchestrated and repeatable pattern of activity, enabled by the systematic organization of resources into processes that transform, provide services, or process information. The workflow point for an incident can be depicted as a sequence of operations, the work of a person or group, or the work of an organization or staff. From a more abstract or higher-level perspective, the workflow of an incident may be considered to be a flow being described by a document, service, or product that is being transferred from one step to another. The workflow point of an incident is where in the workflow the current incident exists, or who, in an incident timeline is currently handling the incident. This includes, a person on an incident response team, a person on an incident wrap up team, a person on a report writing team, a person on an investigation team, a person on a trial team, a person on a prosecuting team, . . . , etc.

Incident Identifier—A sequence of characters used to identify a specific public-safety incident.

Public-Safety Incident Database—A database of incident records.

Alias Number—an alias phone number linked to an officer's phone so calls made by the officer to a member of the public expose the alias and not the officer's actual phone number. All calls to the alias number go to the phone connected to the alias. Most typically, agencies assign an alias to an officer for the long term but in other cases an alias might be used by different officers at different times.

FIG. 1 illustrates a system for implementing the present invention. System 100 includes one or more radio access networks (RANs) 102, a public-safety core network 104, smart devices 112 and 113, network 106, call processor 107, and emergency dispatch center 114 serving as a PSAP.

As shown in FIG. 1, several separate networks exist, namely public-safety core network 104, and public network 106 (e.g., Verizon, Spring, AT&T, . . . , etc.). Network 106 may be wired or wireless, and comprises a standard network configured to facilitate a standard telephone call between any device 112 and dispatch center 114.

Each RAN 102 includes typical RAN elements such as base stations, base station controllers (BSCs), routers, switches, and the like, arranged, connected, and programmed to provide wireless service (such as a telephone call) to user equipment (e.g., tablet computer operated by officer 101 or smart device 113 operated by officer 101) in a manner known to those of skill in the relevant art.

In a similar manner, network 106 includes elements (which may be shared) such as base stations, base station controllers (BSCs), routers, switches, and the like, arranged, connected, and programmed to provide data and call services to user equipment 112 and/or 113 (e.g., smart phone or computers 112 and 113 operated by user 120 and officer 101) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications to/from officer 101.

Smart devices 112 and 113 may be any suitable computing and communication devices configured to engage in wired or wireless communication over network 106 and/or network 104. Such communication may comprise standard cellular data. For example, smart devices 112 and 113 may comprise a mobile device running an Android™ or iOS™ operating system.

Dispatch center 114 is part of a computer-aided-dispatch center, preferably manned by an operator and configured to receive E-911 calls and/or standard telephone calls from devices 112 and 113. For non-public-safety personnel, calls are typically routed from device 112 through network 106. However, for public-safety personnel, either network 104 or 106 may be utilized by device 113 for routing calls. Calls received from device 112 at dispatch center 114 may be provided/forwarded to officer 101 (via core network 104 or network 106). For example, network 106 may receive a call from user 120 destined to officer 101 (smart device 113). Network 106 will route this call to dispatch center 114. The call may be further routed by call processor 107 to device 113 utilizing either network 104 or network 106.

Finally, call processor 107 is provided. Although processor 107 is shown existing within dispatch center 114, in alternate embodiments, processor 107 may be located outside of dispatch center 114. When located outside of dispatch center 114, processor 107 is connected to dispatch center 114 through an intervening network (e.g., networks 104 or 106). Processor 107 is configured to receive a call from device 112 or device 113. Processor 107 then determines a called number and prompts the caller for an incident identifier. Once an incident identifier and a called number are determined, processor 107 then determines a current workflow point for the incident. The call is forwarded to, for example, device 113 (device 113 is associated with officer 101) based on the called number and workflow point of the identified incident.

Because telephone numbers provided by officers to individuals comprise alias numbers (the officer almost never gives out the real number for their phone), and because the same alias number can be assigned exclusively to multiple officers at different times, both the called number (i.e., the alias number) and the incident identifier will be needed to determine an appropriate person to route the call to. For example, at a first time period, Officer Jones was assigned 312-222-3333 as an alias number for incident 14532. At a later time Officer Smith was assigned 312-222-3333 as an alias number for incident 78901. When a call is received to 312-222-3333, processor will use the provided incident identifier to help determine where to route the call. If the caller provides 14532 as the incident number, then processor 107 will determine a work-flow point for incident 14532 to determine an appropriate person to route the call.

Figure 2:
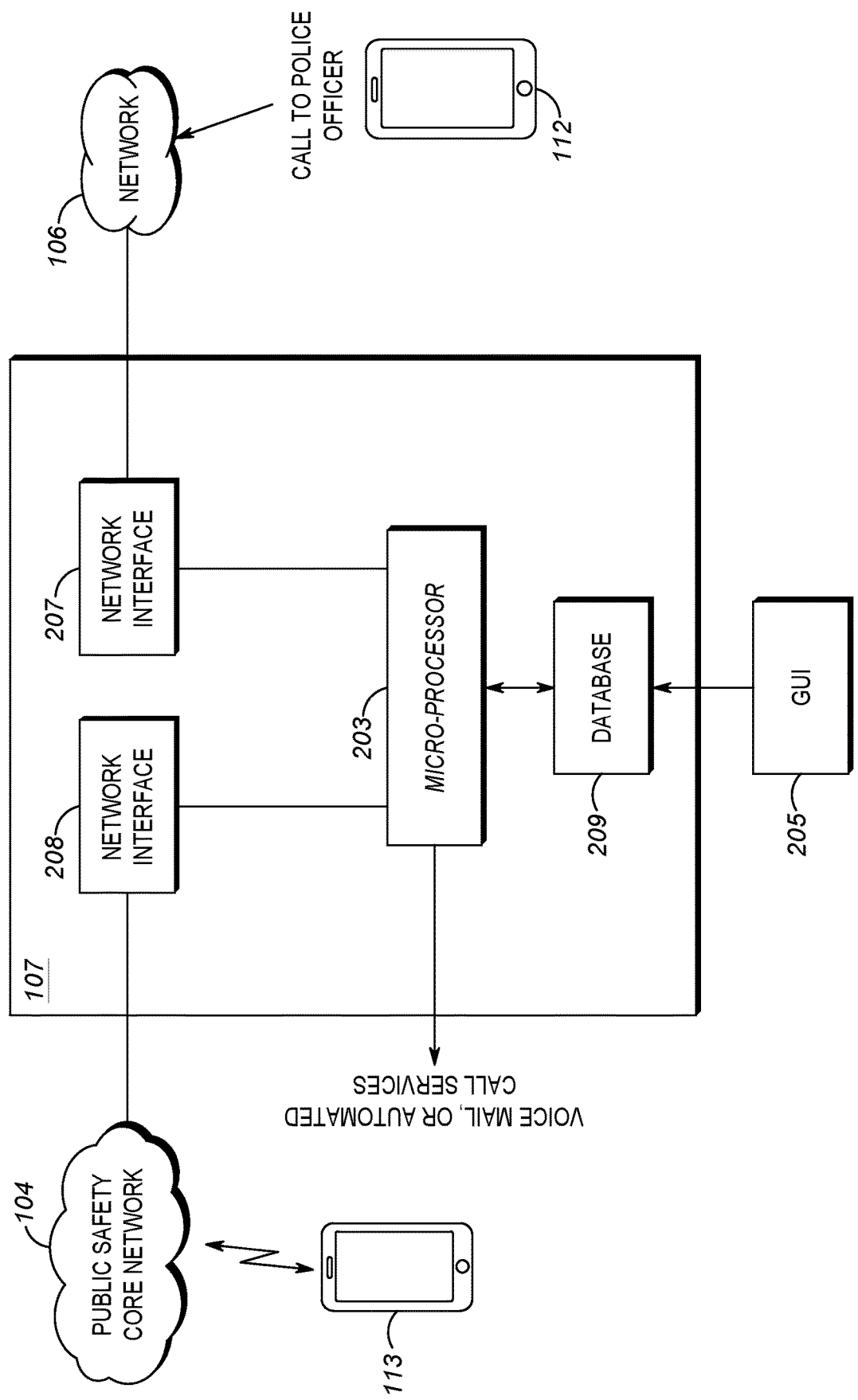
FIG. 2 shows a more-detailed block-diagram of call processor 107.

FIG. 2 shows a more-detailed block-diagram of call processor 107. Call processor 107 preferably includes network interfaces 207 and 208, database 209, and logic circuitry 203. In other implementations, call processor 107 may include more, fewer, or different components.

Graphical user Interface (GUI) 205 serves as an interface to database 209 and is utilized to input data into database 209. In order to accomplish this, GUI 205 preferably comprises a screen (e.g., a liquid crystal display (LCD), organic light-emitting diode (OLED) display, surface-conduction electron-emitter display (SED), plasma display, field emission display (FED), bistable display, projection display, laser projection, holographic display, etc.) that can display data being inserted or retrieved from database 209. In order to provide the above features (and additional features), GUI 205 may include a monitor, a keyboard, a mouse, and/or various other hardware components to provide a man/machine interface. The GUI is preferably operated by a public-safety dispatch operator, and is used to enter data into database 209.

Database 209 is provided and serves as a public-safety incident database. Database 209 comprises standard memory (such as RAM, ROM, . . . , etc). More specifically, database 209 is configured to store incident records and their associated workflow points (i.e., a point within a workflow for the particular incident). Database 209 is preferably populated in real time with information about incidents reported to dispatch center 114. As such, database 209 will be coupled to a PSAP through GUI 205 so that the data may be populated automatically or manually. Database 209 may comprise part of a workflow management system that comprises a software system for setting up, performing, and monitoring of a defined sequence of processes and tasks for an incident.

Logic circuitry 203 comprises a digital signal processor (DSP), general purpose microprocessor, a programmable logic device, or application specific integrated circuit (ASIC) and is configured to determine where to forward calls. More specifically, logic circuitry 203 is configured to receive an incoming call from a civilian and determine the called number and an incident identifier. Public-safety database 209 is accessed to determine a workflow point for the incident identified by the incident identifier. The call is then routed by logic circuitry 203 based on the workflow point of the incident identified by the incident identifier.

In an illustrative embodiment, networks 104 and 106 are attached (i.e., connected) to call processor 107 through network interfaces 207 and 208, and communicate with processor 203. Networks 104 and 106 are connected via a wired connection to network interfaces 207 and 208, although this connection may be wireless in alternative embodiments. Network interfaces 207 and 208 includes elements including processing, modulating, and transceiver elements that are operable in accordance with any one or more standard or proprietary wired or wireless interfaces, wherein some of the functionality of the processing, modulating, and transceiver elements may be performed by means of processor 203.

During operation, network interface 207 receives a call from device 112 having a target identifier number identifying a target of the call. The call is passed to logic circuitry 203. Logic circuitry 203 prompts the caller for an incident identifier via a pre-recorded message, and receives the incident identifier from the caller. Logic circuitry 203 then accesses public-safety incident database 209 and uses the target identifier number and incident identifier to identify an incident record. Logic circuitry 203 then accesses public-safety incident database 209 to determine a workflow point for the incident identified by the incident identifier.

Once the workflow point has been determined for the identified incident, an appropriate officer is determined that should receive the call. For example, immediately after the incident and for a short time afterwards, the initial responder may be the most appropriate one to receive the call. If the case has moved to an investigative stage then it would be best to route call to a detective (or arson investigator or case worker). If the case is closed or otherwise in an administrative only status then the call may be best routed to a records clerk/administrator. Immediately after the incident and for a short time afterwards, the call could also be routed to an alternate officer if it has been determined that the initial responder may should not be the point of contact due to citizen complaint, officer injury, a conflict of interest, etc.

FIG. 2 shows an apparatus comprising network interface 207 configured to a receiving a call from an individual, the call comprising a target phone number, wherein the target phone number comprises a phone number that is assigned exclusively to a first officer's device at a first time period. Logic circuitry 203 is provided, and configured to receive the target phone number from the network interface, prompt the individual for a case number, receive a case identifier from the individual, the case identifier identifying a particular public-safety incident, and determine an officer to route the call to based on the case identifier and the target phone number.

In one embodiment, logic circuitry 203 plays a prerecorded request to the individual requesting the case number. The case number can then be received via voice or touchtone input from the individual. Additionally, the officer to route the call to is determined by using the case identifier to determine a workflow point of the public-safety incident and determining the officer to route the call to based on the case identifier, the target phone number, and the workflow point of the public-safety incident.

The logic circuitry is further configured to route the call to the first officer. This call may be routed via network interface 208 or network interface 207. As discussed above, since another officer may be handling the case at the particular workflow point, the call may be routed to a second officer that differs from the first officer. The workflow point indicates a point in a workflow where the public-safety incident resides.

In one embodiment of the present invention, the calling party number is also received by network interface 207 and passed to logic circuitry 203. If logic circuitry 203 analyzes the calling party number and determines that the calling party is a public-safety officer, logic circuitry 203 may provide the calling public-safety officer with multiple case identifiers that may be associated with the case identifier (case number), and have the officer choose a case identifier when the calling party is an officer.

Figure 3:
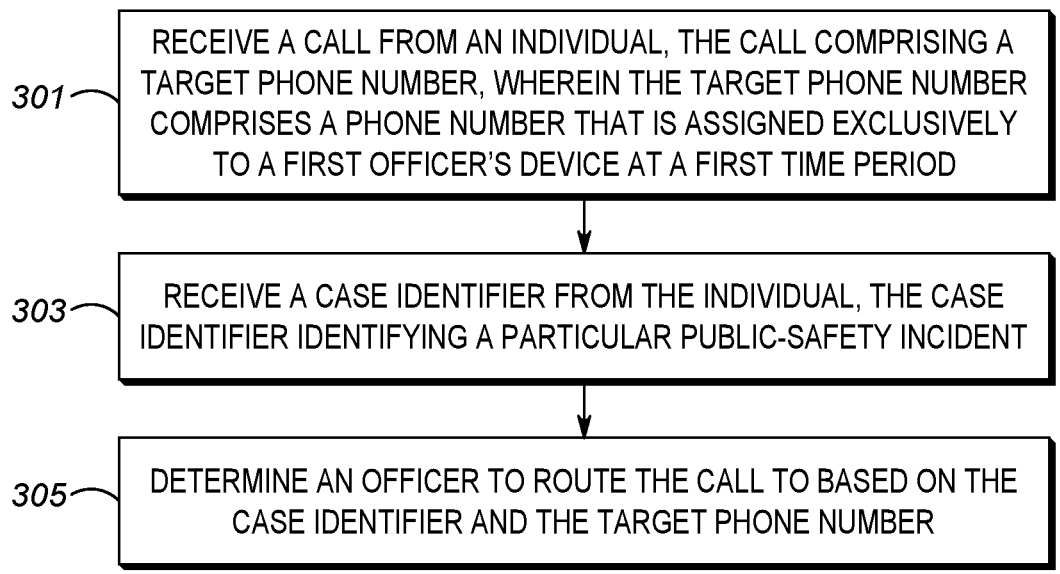
FIG. 3 is a flow chart showing operation of the call processor of FIG. 2.

FIG. 3 is a flow chart showing the operation of call processor 107. The logic flow begins at step 301 where a call is received from an individual, the call comprising a target phone number, wherein the target phone number comprises a phone number that is assigned exclusively to a first officer's device at a first time period.

At step 303, logic circuitry 203 receives a case identifier from the individual, the case identifier identifying a particular public-safety incident, and determines an officer to route the call to based on the case identifier and the target phone number (step 305).

As discussed above, the step of determining an officer to route the call to comprises the steps of using the case identifier to determine a workflow point of the public-safety incident, and determining the officer to route the call to based on the case identifier, the target phone number, and the workflow point of the public-safety incident.

The call may be routed to the first officer, or another officer that differs from the first officer based on the workflow point. As discussed, the workflow point indicates where in the workflow the public-safety incident resides.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for routing calls to an officer, the method comprising the steps of:
   receiving a call from an individual, the call comprising a target phone number, wherein the target phone number comprises a phone number that is assigned exclusively to a first officer's device at a first time period;
   receiving a case identifier from the individual, the case identifier identifying a particular public-safety incident; and
   determining an officer to route the call to based on the case identifier and the target phone number.

2. The method of claim 1 wherein the step of determining an officer to route the call to comprises the steps of:
   using the case identifier to determine a workflow point of the public-safety incident; and
   determining the officer to route the call to based on the case identifier, the target phone number, and the workflow point of the public-safety incident.

3. The method of claim 2 further comprising the step of:
   routing the call to the first officer.

4. The method of claim 2 further comprising the step of:
   routing the call to a second officer that differs from the first officer.

5. The method of claim 2 wherein the workflow point indicates where in the workflow the public-safety incident resides.

6. The method of claim 1 further comprising the step of:
   determining that the individual is an officer; and
   providing the officer with multiple case identifiers and having the officer choose a case identifier when the individual is an officer.

7. The method of claim 1 wherein the case identifier comprises a case number.

8. The method of claim 1 wherein the target phone number is assigned exclusively to a second officer's device during a second time period.

9. An apparatus for routing calls to an officer, the apparatus comprising:
   a network interface configured to a receiving a call from an individual, the call comprising a target phone number, wherein the target phone number comprises a phone number that is assigned exclusively to a first officer's device at a first time period;
   logic circuitry configured to:
      receive the target phone number from the network interface;
      prompt the individual for a case identifier;
      receive a case identifier from the individual, the case identifier identifying a particular public-safety incident; and
      determine an officer to route the call to based on the case identifier and the target phone number.

10. The apparatus of claim 9 wherein the officer to route the call to is determined by:
    using the case identifier to determine a workflow point of the public-safety incident; and
    determining the officer to route the call to based on the case identifier, the target phone number, and the workflow point of the public-safety incident.

11. The apparatus of claim 10 wherein the logic circuitry is further configured to:
    route the call to the first officer.

12. The apparatus of claim 10 wherein the logic circuitry is further configured to:
    route the call to a second officer that differs from the first officer.

13. The apparatus of claim 10 wherein the workflow point indicates a point in a workflow where the public-safety incident resides.

14. The apparatus of claim 10 wherein the logic circuitry is further configured to:
   determine that the individual is an officer; and
   provide the officer with multiple case identifiers and having the officer choose a case identifier when a calling party is an officer.

15. The apparatus of claim 10 wherein the target phone number is assigned exclusively to a second officer's device during a second time period.

* * * * *